(12) United States Patent
Kawahara et al.

(10) Patent No.: US 12,016,806 B2
(45) Date of Patent: Jun. 25, 2024

(54) WHEEL, DRIVE WHEEL, AND WHEELCHAIR

(71) Applicant: HONDA MOTOR CO., LTD., Tokyo (JP)

(72) Inventors: Yoshihiro Kawahara, Saitama (JP);
Tomoki Murozono, Saitama (JP);
Yasuhiro Toguchi, Saitama (JP);
Nobuyuki Shibutani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 640 days.

(21) Appl. No.: 17/279,370

(22) PCT Filed: Aug. 26, 2019

(86) PCT No.: PCT/JP2019/033295
§ 371 (c)(1),
(2) Date: Mar. 24, 2021

(87) PCT Pub. No.: WO2020/075401
PCT Pub. Date: Apr. 16, 2020

(65) Prior Publication Data
US 2021/0393459 A1    Dec. 23, 2021

(30) Foreign Application Priority Data

Oct. 12, 2018  (JP) ................................ 2018-193716

(51) Int. Cl.
*A61G 5/10* (2006.01)
*B60B 3/04* (2006.01)
(Continued)

(52) U.S. Cl.
CPC .......... *A61G 5/1054* (2016.11); *A61G 5/1051* (2016.11); *B60B 3/04* (2013.01); *B60B 3/12* (2013.01); *B60B 5/02* (2013.01)

(58) Field of Classification Search
CPC ...... A61G 5/1054; A61G 1/1051; B60B 3/04; B60B 3/12; B60B 5/02
See application file for complete search history.

(56) References Cited

U.S. PATENT DOCUMENTS 1,483,654 A * 2/1924 Eschwig .................... B60B 3/04
                                                         301/63.101
2,447,428 A * 8/1948 O'Leary ................. B60B 11/10
                                                           301/38.1
(Continued)

FOREIGN PATENT DOCUMENTS

EP        1 435 322 A2    7/2004
GB        1 211 739 A    11/1970
(Continued)

*Primary Examiner* — Kevin Hurley
*Assistant Examiner* — Michael R Stabley
(74) *Attorney, Agent, or Firm* — Carrier, Shende & Associates P.C.; Joseph P. Carrier; Fulchand P. Shende

(57) ABSTRACT

Provided is a wheel (6a) in which a disk (62) includes a ring-shaped rim (60) on which a tire (6b) is fitted, and a disk (62) having a flat circular shape and disposed on an inner circumference of the rim (60). The disk (62) includes a first rib (62a) and a second rib (62b) which extend in a radial direction of the disk (62). A width of each of the first rib (62a) and the second rib (62b) in a circumferential direction of the disk (62) increases toward an outer circumferential side of the disk (62).

6 Claims, 9 Drawing Sheets

(51) Int. Cl.
*B60B 3/12* (2006.01)
*B60B 5/02* (2006.01)

(56) References Cited

U.S. PATENT DOCUMENTS

| | | | | | |
|---|---|---|---|---|---|
| 3,547,494 | A | * | 12/1970 | Lejeune | B21D 53/26 |
| | | | | | 301/64.101 |
| 5,131,727 | A | * | 7/1992 | Johnson | B60B 7/02 |
| | | | | | 301/37.43 |
| 5,533,793 | A | * | 7/1996 | Walker | B60B 25/002 |
| | | | | | 152/453 |
| D442,903 | S | * | 5/2001 | Brintouch | D12/204 |
| 7,347,439 | B2 | * | 3/2008 | Young | B60B 7/20 |
| | | | | | 280/288.4 |
| 7,581,794 | B1 | * | 9/2009 | Milow | B60B 7/12 |
| | | | | | 403/353 |
| 7,775,540 | B2 | * | 8/2010 | Young | B60B 7/14 |
| | | | | | 280/288.4 |
| 10,266,003 | B2 | | 4/2019 | Kawahara et al. | |
| 2017/0253075 | A1 | * | 9/2017 | Kawahara | B60B 3/087 |

FOREIGN PATENT DOCUMENTS

| | | | |
|---|---|---|---|
| GB | 1211739 A | * | 11/1970 |
| JP | S36-6202 Y1 | | 3/1961 |
| JP | S49-25952 Y1 | | 7/1974 |
| JP | S50-17722 B1 | | 6/1975 |
| JP | 2014-180934 A | | 9/2014 |
| JP | 2017-158623 A | | 9/2017 |

\* cited by examiner

WHEEL, DRIVE WHEEL, AND WHEELCHAIR

TECHNICAL FIELD

The present invention relates to a wheel, and more particularly to a wheel for a driving wheel of a racing wheelchair for use in track race, marathon or the like.

BACKGROUND ART

Heretofore, as a wheel for use in a driving wheel of a wheelchair, a bicycle or the like, a wheel has been known which comprises a ring-shaped rim on which a tire is fitted, and a disk having a flat circular shape and disposed on an inner circumference of the rim.

As this type of wheel, there is a wheel in which a plurality of spokes extending in a radial direction between the rim and the hub are arranged. However, if the spokes are made thinner or the spokes are made of a lighter material in order to reduce weight of this wheel, there is concern that a sufficient strength of the whole wheel cannot be obtained. Furthermore, in a case where the spokes are made of a light and strong material, this material is expensive, and hence there is concern that manufacturing cost increases.

To solve this problem, the present applicants suggest a wheel in which a disk is provided with protrusions (e.g., see Patent Literature 1). According to this wheel, the protrusions receive load in place of the spokes, and hence, for example, the spokes can be omitted, or a lighter material can be employed as a spoke forming material.

CITATION LIST

Patent Literature

Patent Literature 1: Japanese Patent Laid-Open No. 2017-158623

SUMMARY OF INVENTION

Technical Problem

Even a wheel described in Patent Literature 1 can obtain a strength similar to that of a wheel comprising spokes. However, there is a request that the strength is to be further increased, from a user of a wheelchair in which the wheel is used (e.g., a passenger).

The present invention has been developed in view of the above respect, and an object thereof is to provide a wheel having a high strength while being inexpensive and lightweight, and a driving wheel and a wheelchair in which the wheel is used.

Solution to Problem

According to the present invention, provided is a wheel comprising:
a ring-shaped rim on which a tire is fitted, and a disk having a flat circular shape and disposed on an inner circumference of the rim, characterized in that
the disk comprises a protrusion extending in a radial direction of the disk, and
a width of the protrusion in a circumferential direction of the disk increases toward an outer circumferential side of the disk.

Thus, the disk of the wheel of the present invention is provided with the protrusion extending in the radial direction. Consequently, in this wheel, a load in the radial direction, which is borne by a spoke, can be borne by the protrusion of the disk. In other words, all or a part of the load, which is borne by the spoke, can be borne by the disk. As a result, the spoke can be omitted, and a material of the spoke can be made to be lighter, so that weight reduction of the wheel and cost reduction can be achieved.

Furthermore, the wheel of the present invention includes a configuration where the width of the protrusion in the circumferential direction increases toward the outer circumferential side. Consequently, load applied from an end portion of the protrusion on the outer circumferential side to a region around the end portion is distributed, as compared with a configuration where the width of the protrusion is constant, or decreases toward the outer circumferential side. As a result, the region is less likely to be damaged, and eventually, increase in a strength of the whole disk (i.e., the wheel) can be achieved.

Additionally, in the wheel of the present invention, it is preferable that:
the protrusion protrudes out to one side in a central axis direction of the disk, and
in a portion of the disk which corresponds to the protrusion on the other side in the central axis direction, a groove dented toward the one side in the central axis direction of the disk is formed.

According to this configuration, the protrusion is hollow. Consequently, a weight of the whole disk can be decreased as compared with a case where the protrusion is solid.

Furthermore, in the wheel of the present invention, it is preferable that:
an edge shape of a tip portion of the protrusion on the outer circumferential side in the radial direction is a curved shape which is curved along a circumferential edge of the disk, or a straight line shape which is orthogonal to a straight line passing a center of the disk and extending in the radial direction.

According to this configuration, the load applied from the end portion of the protrusion on the outer circumferential side to the region around the end portion is further distributed. As a result, the region is further less likely to be damaged, and eventually, further increase in a strength of the whole disk (i.e., the wheel) can be achieved.

Additionally, in the wheel of the present invention, it is preferable that at least one of a pair of side surfaces of the protrusion is inclined relative to a plane including a central axis of the disk.

According to this configuration, load applied from the side surfaces of the protrusion to a region around the surfaces is distributed in a direction along a plane part of the disk, as compared with a configuration where the side surfaces of the protrusion are parallel to the plane including the central axis of the disk (i.e., a configuration where the side surfaces are vertical to the plane part of the disk). As a result, the region is less likely to be damaged, and eventually, further increase in a strength of the whole disk (i.e., the wheel) can be achieved.

Furthermore, in the wheel of the present invention, in a configuration where the side surfaces of the protrusion are inclined,
it is preferable that an inclination angle of the at least one of the pair of side surfaces of the protrusion relative to the plane increases toward the outer circumferential side of the disk.

According to this configuration, a width of an end portion of the protrusion on an inner circumferential side is smaller, as compared with a configuration where the inclination angle of each side surface of the protrusion is constant. Consequently, even in a case where a plurality of protrusions are provided, a sufficient space between the protrusions can be acquired in a region in a vicinity of a central part. As a result, moldability in the region can be improved.

Additionally, in the wheel of the present invention, it is preferable that the disk comprises a plurality of protrusions, and a flat plate provided between two protrusions which are adjacent, the flat plate is formed by stacking a plurality of fiber reinforced material sheets including at least a first fiber reinforced material sheet and a second fiber reinforced material sheet, the first fiber reinforced material sheet includes a first fiber having a fiber direction being a first direction along a straight line passing a center of the first fiber reinforced material sheet and extending from a center of the disk in the radial direction, and the second fiber reinforced material sheet includes a second fiber having a fiber direction being the first direction, and a third fiber having a fiber direction being a second direction intersecting the first direction.

According to this configuration, a force applied to the wheel can be efficiently received by the fibers. As a result, rigidity of the whole wheel can be improved without adding any special parts or the like.

A driving wheel of the present invention is characterized by comprising any wheel described above, and a tire fitted on the wheel.

The wheelchair of the present invention is a wheelchair comprising a cage including a seating seat, a vehicle body frame extending forward from the cage, a steering handle provided to the vehicle body frame, a front wheel attached to a front end portion of the vehicle body frame, and a pair of rear wheels attached to right and left sides of the cage, characterized in that each of the rear wheels is the above driving wheel.

DESCRIPTION OF EMBODIMENT

Hereinafter, description will be made as to a configuration of a wheelchair W according to an embodiment with reference to the drawings. Note that the wheelchair W of the present embodiment is for use in track race, marathon or the like. However, the wheel of the present invention is not applicable only to a racing wheelchair, and is also applicable to a wheel of a wheelchair for use in daily life, another vehicle such as a bicycle or the like.

First, a schematic configuration of the wheelchair W will be described with reference to FIG. 1 to FIG. 3.

Figure 1:
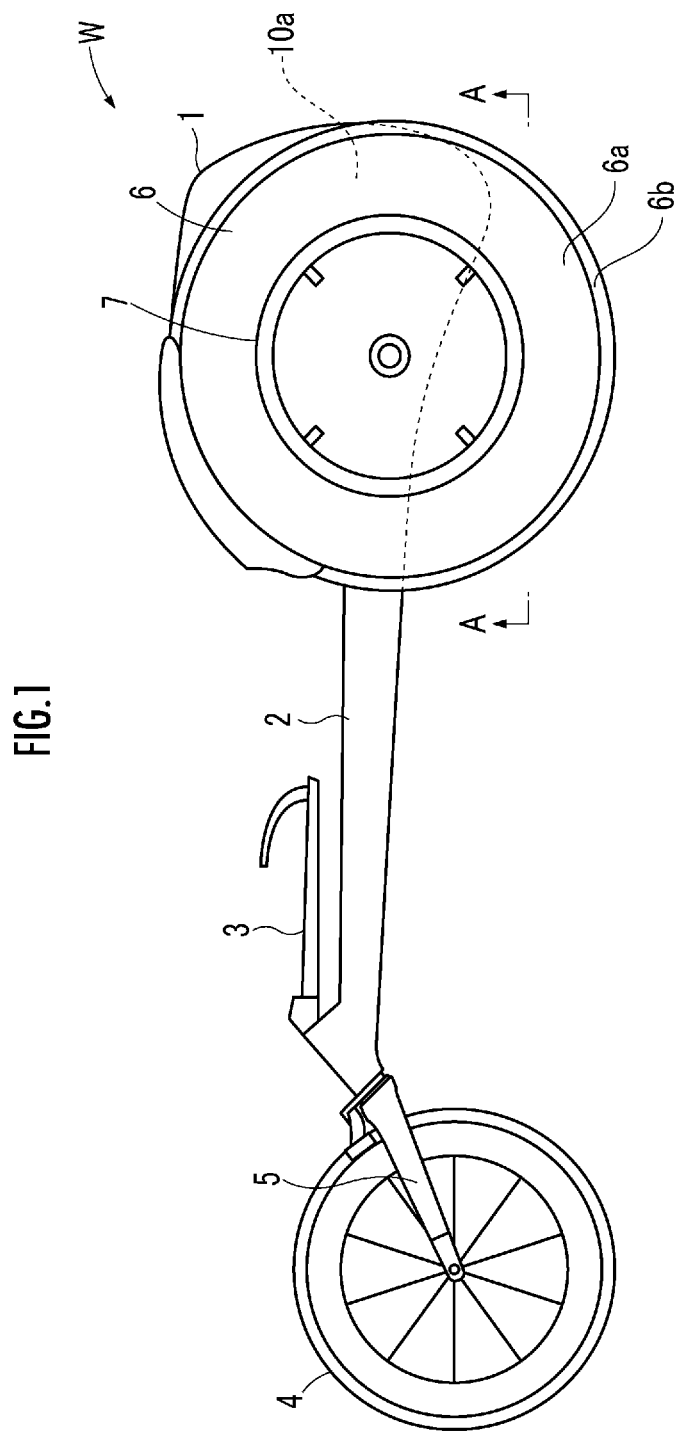
FIG. 1 is a side view of a wheelchair according to an embodiment of the present invention.

As shown in FIG. 1, the wheelchair W comprises a cage 1, a vehicle body frame 2 extending forward from the cage 1, a steering handle 3 provided to the vehicle body frame 2, a front wheel 4 disposed in a front end portion of the vehicle body frame 2, a front fork 5 which is attached to the front end portion of the vehicle body frame 2, and to which the handle 3 is coupled, to hold the front wheel 4, a pair of rear wheels 6 (driving wheels) attached to right and left sides of the cage 1, and a hand rim 7 attached to the rear wheels 6 on a side opposite to the cage 1.

Figure 2:
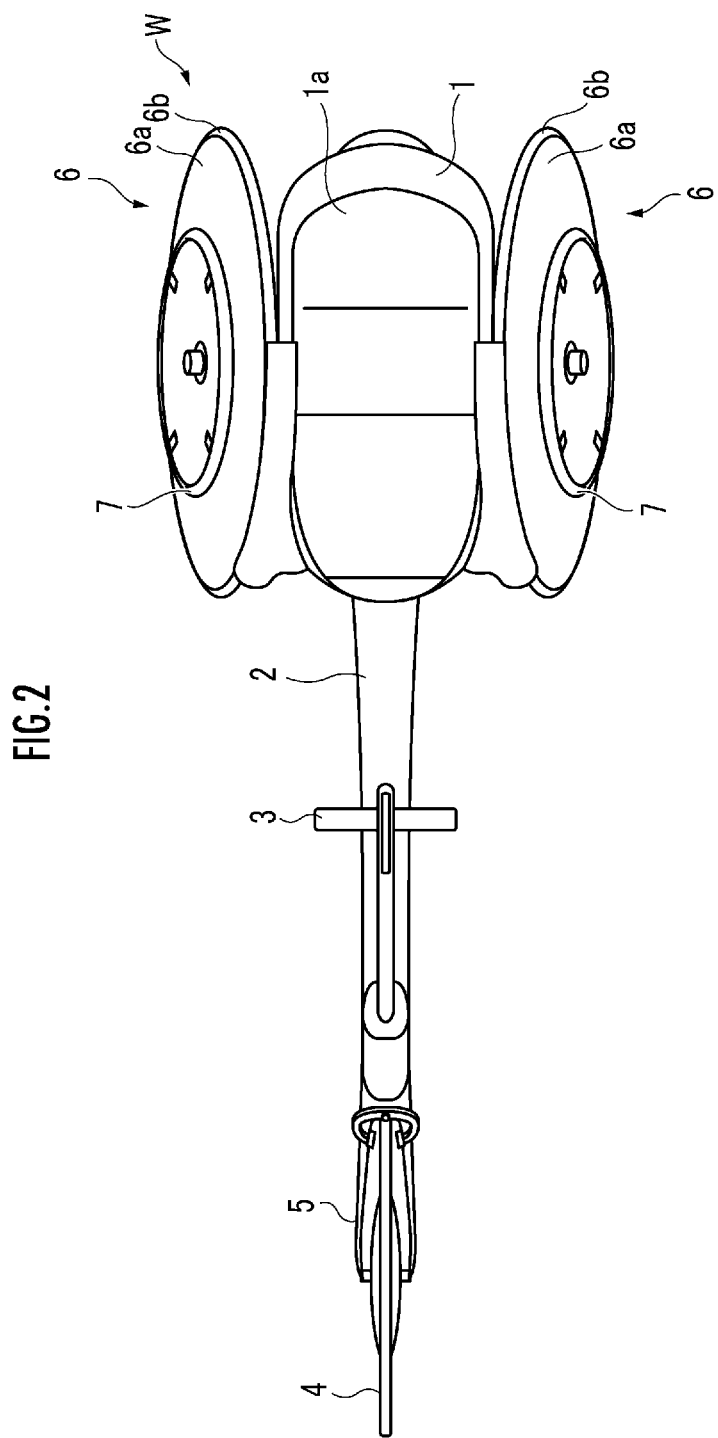
FIG. 2 is a plan view of the wheelchair of FIG. 1.

As shown in FIG. 2, the cage 1 has an upper part opened, and in the cage, a seating seat 1a, on which an athlete (a passenger) sits, is disposed.

The handle 3 is connected to an end portion of a column part 5a (see FIG. 3) of the front fork 5 pivotally supported in a tip portion of the vehicle body frame 2. In the wheelchair W, if the handle 3 is operated, an orientation of the front wheel 4 can be changed via the front fork 5, and the wheelchair W can be turned in a desired direction.

Each of the rear wheels 6 is constituted of a wheel 6a, and a tire 6b fitted on the wheel 6a. The rear wheel 6 is attached to the cage 1 via an axle (not shown) extending laterally from the cage 1 in a state where an upper part of the rear wheel 6 is inclined close to the cage 1.

The hand rim 7 is integrally rotatably fixed to the rear wheel 6. The athlete who sits on the seating seat 1a transmits a driving force to the rear wheels 6 via the hand rims 7.

Figure 3:
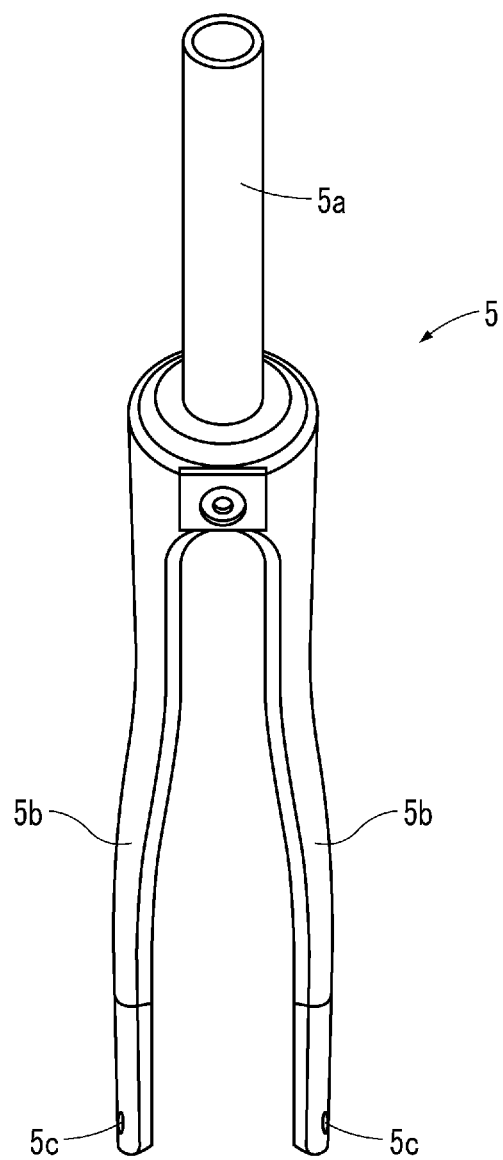
FIG. 3 is a perspective view of a front fork of the wheelchair of FIG. 1 seen from a front side.

As shown in FIG. 3, the front fork 5 includes the column part 5a supported in the tip portion of the vehicle body frame 2, and fork parts 5b extending in a bifurcated manner forward from the column part 5a. In tip portions of the fork parts 5b, bearing holes 5c which support the axle of the front wheel 4 are formed.

The column part 5a is formed in a cylindrical shape, and pivotally supported by the front end portion of the vehicle body frame 2 via a bearing (not shown). The handle 3 (see FIG. 1) is fixedly provided to an upper end portion of the column part 5a.

Next, description will be made as to the wheel 6a of the rear wheel 6 of the wheelchair W with reference to FIG. 2 and FIG. 4 to FIG. 12.

First, a schematic configuration of the wheel 6a will be described with reference to FIG. 2 and FIG. 4.

As shown in FIG. 2, the wheelchair W comprises the pair of rear wheels 6 on the right and left sides of the cage 1. Each rear wheel 6 is constituted of the wheel 6a, and the tire 6b fitted on the wheel 6a. The rear wheel 6 is attached to the cage 1 in the state where the upper part of the rear wheel 6 is inclined close to a central side on a cage 1 side.

Figure 4:
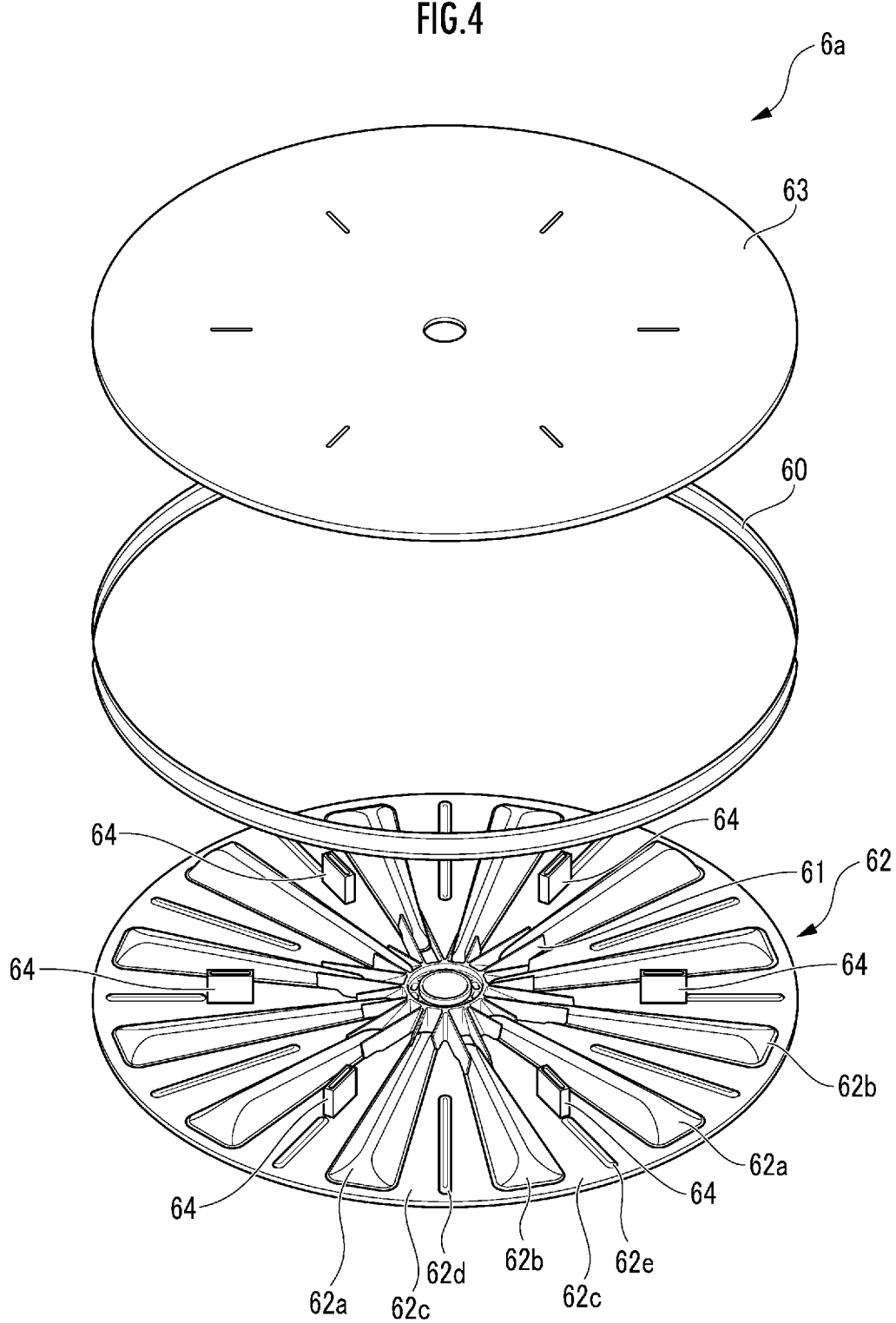
FIG. 4 is an exploded perspective view of a wheel of the wheelchair of FIG. 1 seen from an attaching side to a cage.

As shown in FIG. 4, the wheel 6a comprises a ring-shaped rim 60 on which the tire 6b (see FIG. 2) is fitted, a hub 61 which is disposed in a central part of the rim 60, and to which the axle extending from the cage 1 is coupled, a disk 62 having a flat circular shape, including a circumferential edge portion to which the rim 60 is attached, and configured to cover an inner circumferential side of the rim 60 on the cage 1 side, a cover 63 configured to cover the inner circumferential side of the rim 60 on the side opposite to the cage 1, and holders 64 arranged at regular intervals in a circumferential direction between the disk 62 and the cover 63.

The hand rim 7 is fixed to the holders 64 via screws (not shown) extending through the hand rim 7, the cover 63 and the disk 62.

The disk 62 and the cover 63 are formed by stacking fiber reinforced material sheets (hereinafter, referred to simply as "FRP sheets") made of fiber reinforced plastic, and then performing a heating treatment.

As a material which forms the FRP sheet, for example, fiber reinforced plastic in which polyacrylonitrile (PAN) carbon fiber is used, aramid fiber reinforced plastic, fiber reinforced plastic reinforced by glass fiber, pitch carbon fiber, PBO fiber, polyarylate fiber or polyethylene fiber, or the like is used.

The disk 62 of the present embodiment is formed by stacking at least two or more FRP sheets.

Furthermore, a cut-out sheet of a cloth material including two types of fibers different in a fiber direction is used as a first FRP sheet (a first fiber reinforced material sheet) which forms a body part of the disk 62 among the FRP sheets which form the disk 62.

The fiber direction of one fiber (a first fiber) of fibers included in a second FRP sheet is a direction (a first direction) along a straight line passing a predetermined position (e.g., a center of an edge on an inner side in a radial direction of the cut-out FRP sheet) among straight lines extending from a center of the disk 62 in the radial direction. Furthermore, the fiber direction of another fiber is a direction which intersects the first direction.

Additionally, a cut-out sheet of a cloth material including two types of fibers different in a fiber direction is also used as the second FRP sheet (the second fiber reinforced material sheet) which forms a surface on the cage 1 side among the FRP sheets which form the disk 62.

The fiber direction of one fiber (a second fiber) of the fibers included in the second FRP sheet is the direction (a first direction) along a straight line passing a center of the first FRP sheet among the straight lines extending from the center of the disk 62 in the radial direction. Furthermore, the fiber direction of another fiber (a third fiber) is a direction (a second direction) which intersects the first direction.

In a configuration where an orientation of the fiber included in the FRP sheet is set to this orientation, a force applied to the wheel 6a can be efficiently received by the fibers. As a result, rigidity of the whole wheel 6a can be improved without adding any special parts or the like.

Note that a forming method and a forming material of the disk 62 and the cover 63 are not necessarily limited to such forming method and forming material as described above. For example, a unidirectional reinforcing material (a UD material) may be used in place of the cloth material. Alternatively, for example, a metal such as iron or aluminum may be the forming material. Alternatively, for example, the forming method may be injection molding only by use of a resin material. Next, description will be made as to a shape of the disk 62 of the wheel 6a with reference to FIG. 5 and FIG. 6.

Figure 5:
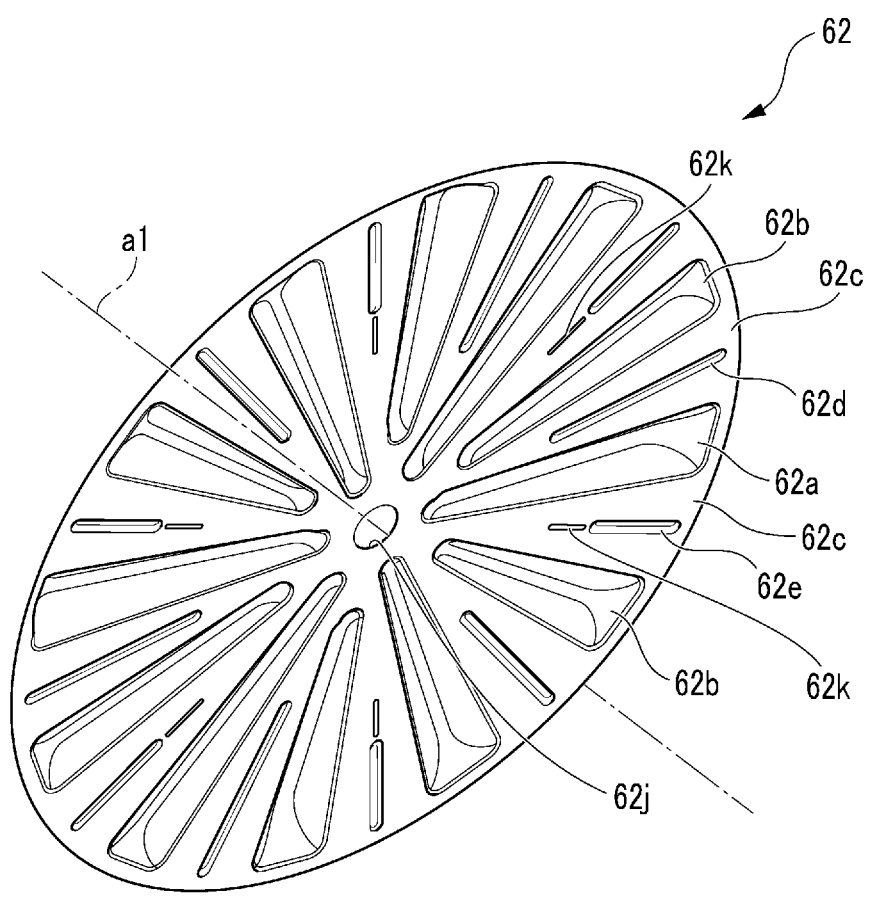
FIG. 5 is a perspective view of a disk of the wheel of FIG. 4 seen from the attaching side to the cage.

As shown in FIG. 5, on a surface of the disk 62 on one side (i.e., on the side opposite to the cage 1 which is a left side in FIG. 5) in a direction of a first central axis a1 which is a central axis, a plurality of first ribs 62a (first protrusions) and a plurality of second ribs 62b (second protrusions) are provided to protrude out on one side in the first central axis a1 direction, and to extend in the radial direction of the disk 62. The first ribs 62a and the second ribs 62b are alternately arranged in a circumferential direction of the disk 62.

Furthermore, almost fan-shaped flat plates 62c are provided one by one between the first rib 62a and the second rib 62b which are adjacent.

Additionally, at a central position of the disk 62 in the circumferential direction in each of the plurality of flat plates 62c, a first auxiliary rib 62d or a second auxiliary rib 62e is provided to protrude out on the one side in the first central axis a1 direction, and to extend in the radial direction of the disk 62. The first auxiliary ribs 62d and the second auxiliary ribs 62e are alternately arranged in the circumferential direction of the disk 62.

Thus, the disk 62 of the wheel 6a is provided with the first ribs 62a, the second ribs 62b, the first auxiliary ribs 62d and the second auxiliary ribs 62e which extend in the radial direction.

Consequently, in the wheel 6a, a load in the radial direction, which is borne by spokes, can be borne by the first ribs 62a, the second ribs 62b, the first auxiliary ribs 62d and the second auxiliary ribs 62e of the disk 62. In other words, all or a part of the load borne by the spokes can be borne by the disk 62.

As a result, in the disk 62, the spokes are omitted, or a material of the spokes is made to be lighter, to achieve weight reduction of the disk 62 (eventually, the wheel 6a) and cost reduction.

Additionally, in the disk 62, a number of the first ribs 62a, the second ribs 62b, the first auxiliary ribs 62d, or the second auxiliary ribs 62e to be provided is six. However, the wheel of the present invention is not limited to this configuration, and the number of the ribs (the protrusions) may be appropriately designed in accordance with required strength, weight or the like.

For example, in the wheel 6a of the present embodiment, one of each first rib 62a and each second rib 62b as well as one of each first auxiliary rib 62d and each second auxiliary rib 62e may be omitted. Conversely, the number of any ribs may be increased.

Figure 6:
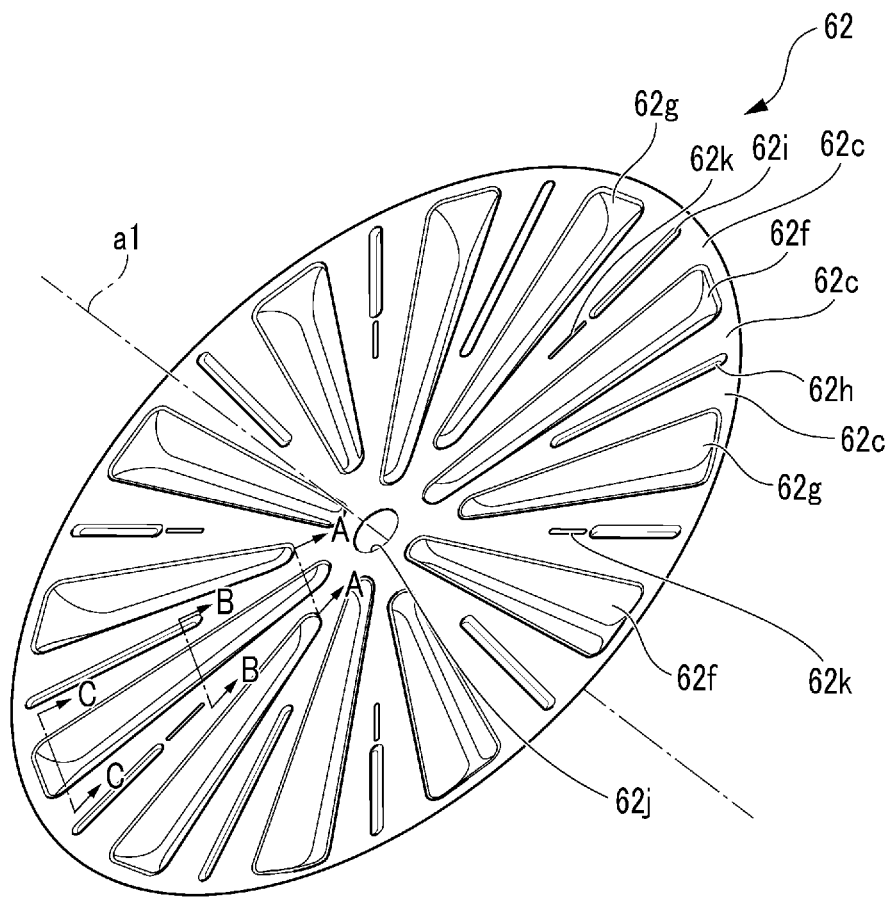
FIG. 6 is a perspective view of the disk of the wheel of FIG. 4 seen from a side opposite to the attaching side to the cage.

Furthermore, a protruding direction of the rib (the protrusion) is not limited to the side opposite to the cage, and may be on a cage side. Furthermore, each rib may have a different protruding direction. Additionally, as shown in FIG. 6, on a surface of the disk 62 on the other side (i.e., on the cage 1 side which is a left side in FIG. 6) in the first central axis a1 direction of the disk 62, a plurality of first grooves 62f, a plurality of second grooves 62g, a plurality of third grooves 62h and a plurality of fourth grooves 62i are provided to be dented toward one side in the first central axis a1 direction (i.e., the side opposite to the cage 1 which is a right side in FIG. 6).

Specifically, the first grooves 62f are provided at positions corresponding to the first ribs 62a. The second grooves 62g are provided at positions corresponding to the second ribs 62b. The third grooves 62h are provided at positions corresponding to the first auxiliary ribs 62d. The fourth grooves 62i are provided at positions corresponding to the second auxiliary ribs 62e.

In the disk 62, since the first grooves 62f, the second grooves 62g, the third grooves 62h and the fourth grooves 62i are provided in this manner, the first ribs 62a, the second ribs 62b, the first auxiliary ribs 62d and the second auxiliary ribs 62e have hollow shapes. Consequently, further weight reduction of the whole disk 62 (eventually, the wheel 6a) can be achieved as compared with a case where the first ribs 62a, the second ribs 62b, the first auxiliary ribs 62d and the second auxiliary ribs 62e are solid.

Note that the wheel of the present invention is not limited to this configuration. The grooves may be omitted, and the ribs (the protrusions) may be made to be solid. In this case, a weight of the wheel is larger, but a strength thereof is larger than in a case where the ribs are made to be hollow. Therefore, hollow protrusions and solid protrusions may be mixed in accordance with the required strength.

Furthermore, as shown in FIG. 5 and FIG. 6, a first insertion hole 62j extending through the disk 62 in the first central axis a1 direction is formed in a central part of the disk 62. The axle extending from the cage 1 is inserted into the first insertion hole 62j.

Additionally, second through holes 62k extending through the disk 62 in the first central axis a1 direction are formed at positions of the disk 62 which correspond to the holders 64 (see FIG. 4). The screws to fix the hand rim 7 are inserted into the second through holes 62k.

Next, description will be made as to the first ribs 62a, the second ribs 62b, the first auxiliary ribs 62d and the second auxiliary ribs 62e of the disk 62 with reference to FIG. 5 and FIG. 7 to FIG. 10.

As shown in FIG. 5, the first ribs 62a and the second ribs 62b are provided to extend in the radial direction from the center of the disk 62. Each of a width of the first rib 62a in the circumferential direction and a width of the second rib 62b in the circumferential direction is configured to increase toward an outer circumferential side of the disk 62.

In this configuration, a load to be applied from end portions of the first rib 62a and the second rib 62b on the outer circumferential side to a region around the end portions is distributed, as compared with a configuration where the width of the first rib 62a in the circumferential direction and the width of the second rib 62b in the circumferential direction are constant, or decrease toward the outer circumferential side. As a result, the region is less likely to be damaged, and eventually, increase in a strength of the whole disk 62 (i.e., the wheel 6a) can be achieved.

An edge shape of each of tip portions of the first ribs 62a and the second ribs 62b of the disk 62 on the outer circumferential side is a curved shape which is loosely curved along a circumferential edge of the disk 62.

Furthermore, a length of the first rib 62a in the radial direction of the disk 62 is larger than a length of the second rib 62b in the radial direction. However, a position, in the radial direction of a tip of the first rib 62a on the outer circumferential side and a position of a tip of the second rib 62b on the outer circumferential side are configured to be arranged almost in a row in the circumferential direction of the disk 62.

Additionally, an angle formed by opposite side surfaces of the second rib 62b is set to be larger than an angle formed by opposite side surfaces of the first rib 62a. Consequently, a width of the tip portion of the first rib 62a on the outer circumferential side in the circumferential direction is about the same as a width of the second rib 62b on the outer circumferential side in the circumferential direction.

Thus, in the disk 62, the edge shape of the tip portion of the first rib 62a or the second rib 62b on the outer circumferential side of the disk 62, the position of the tip in the radial direction and the width of the tip portion in the circumferential direction are configured as described above. Consequently, the load applied from the end portions of the first rib 62a and the second rib 62b on the outer circumferential side to the region around the end portions is uniformly distributed.

Note that the wheel of the present invention is not limited to this configuration. For example, the edge shape of the tip portion of the rib (the protrusion) on the outer circumferential side may be a straight line shape which is orthogonal to the straight line passing the center of the disk and extending in the radial direction. Furthermore, the shape may be a straight line shape crossing to be inclined relative to the straight line passing the center of the disk and extending in the radial direction, in consideration of a rotating direction of the wheel in which the disk is used. Alternatively, for example, the positions of the tips of the plurality of ribs (protrusions) on the outer circumferential side may shift, and the widths of the tip portions of the plurality of ribs on the outer circumferential side in the circumferential direction may vary.

The first auxiliary rib 62d and the second auxiliary rib 62e are provided to extend from the center of the disk 62 in the radial direction. A length of the first auxiliary rib 62d in the radial direction of the disk 62 is larger than a length of the second auxiliary rib 62e in the radial direction. However, a position of a tip of the first auxiliary rib 62d on the outer circumferential side in the radial direction and a position of a tip of the second auxiliary rib 62e on the outer circumferential side are configured to be arranged almost in a row in the circumferential direction of the disk 62.

Thus, in the disk 62, the positions of the tips of the first auxiliary rib 62d and the second auxiliary rib 62e on the outer circumferential side in the radial direction of the disk 62 are configured as described above. Consequently, a load applied from end portions of the first auxiliary rib 62d and the second auxiliary rib 62e on the outer circumferential side to a region around the end portions is uniformly distributed.

Figure 7:
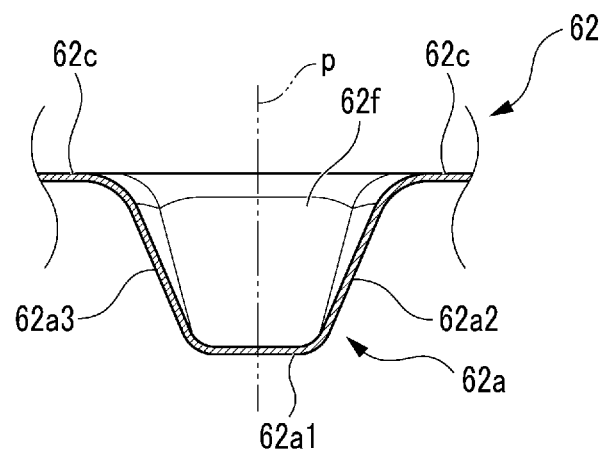
FIG. 7 is a cross-sectional view of the disk taken along a line A-A of FIG. 6.
Figure 8:
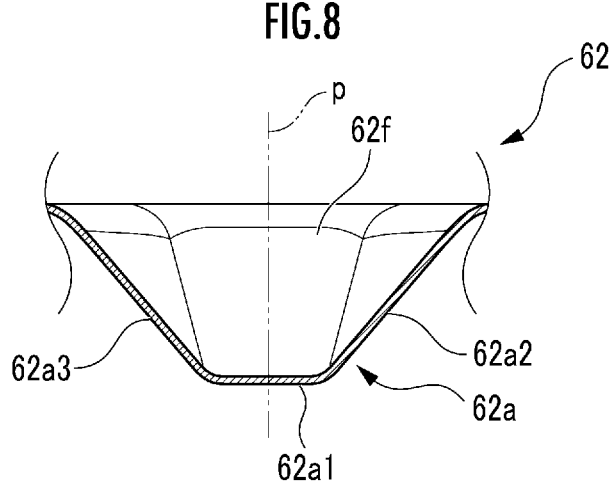
FIG. 8 is a cross-sectional view of the disk taken along a line B-B of FIG. 6.
Figure 9:
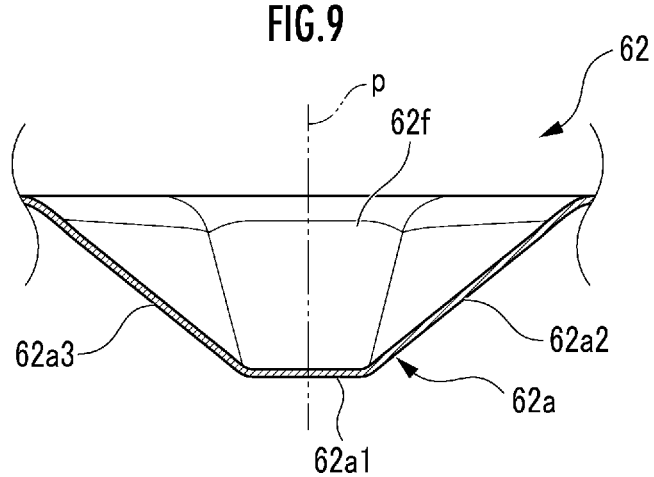
FIG. 9 is a cross-sectional view of the disk taken along a line C-C of FIG. 6.

Furthermore, as shown in FIG. 7 to FIG. 9, a cross-sectional shape of the first rib 62a is a hollow trapezoidal shape which protrudes out on one side of a central axis of the disk 62 (on the side opposite to the cage 1 which is a lower side in FIG. 7 to FIG. 9).

Specifically, the first rib 62a includes a bottom surface 62a1 extending in parallel with the flat plate 62c at a position away from the flat plate 62c on the side opposite to the cage 1, a first side wall 62a2 located on one side (a right side in FIG. 7 to FIG. 9) of the bottom surface 62a1 in the circumferential direction of the disk 62, and a second side wall 62a3 located on the other side of the bottom surface 62a1 (a left side in FIG. 7 to FIG. 9) in the circumferential direction of the disk 62.

The first side wall 62a2 and the second side wall 62a3 are inclined to be symmetric via a virtual plane p, as seen relative to the virtual plane p which is a plane including the first central axis a1 (see FIG. 5 and FIG. 6) of the disk 62 from the radial direction of the disk 62. In other words, the first side wall 62a2 and the second side wall 62a3 are inclined relative to the flat plates 62c of the disk 62.

In this configuration, a load applied from the first side wall 62a2 and the second side wall 62a3 to a region around the walls is distributed in a direction along a plane part of the disk 62, as compared with a configuration where the first side wall 62a2 and the second side wall 62a3 are parallel to the virtual plane p (i.e., a configuration where the walls are vertical to the plane part of the disk 62).

Consequently, in the disk 62, inhibition of damages on the region, eventually further increase in a strength of the whole disk 62 (i.e., the wheel 6a) can be achieved.

Figure 10:
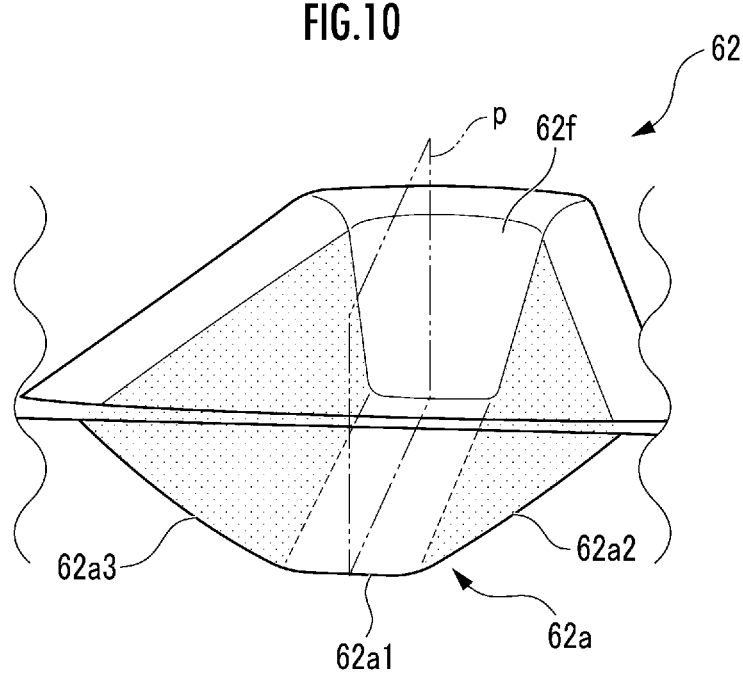
FIG. 10 is a perspective view of a first rib of the disk of FIG. 6 seen from an outer circumferential side in a radial direction.

As shown in FIG. 10, an inclination angle of each of the first side wall 62a2 and the second side wall 62a3 to the virtual plane p is configured to increase toward the outer circumferential side of the disk 62. Specifically, the inclination angle in the central part (see FIG. 8) is larger than the inclination angle on the inner circumferential side (see FIG. 7), and the inclination angle on the outer circumferential side (see FIG. 9) is larger than the inclination angle in the central part.

In other words, the first side wall 62a2 and the second side wall 62a3 are inclined relative to the virtual plane p not only as seen from the radial direction of the disk 62 but also as seen from the first central axis a1 direction of the disk 62.

In this configuration, a width of an end portion of each of the first side wall 62a2 and the second side wall 62a3 on the inner circumferential side is smaller (see FIG. 5 and FIG. 6), as compared with a configuration where the inclination angle is constant.

Consequently, even in a case where the disk 62 is provided with a plurality of first side walls 62a2 and a plurality of second side walls 62a3, a sufficient space between the first side wall 62a2 and the second side wall 62a3 which are adjacent is acquired in a region of a vicinity of the central part. In other words, improvement of a moldability in the region can be achieved.

Furthermore, although detailed description is omitted, the second rib 62b has a shape similar to that of the first ribs 62a.

Note that a configuration of the side walls of the rib (side surfaces of the protrusion) of the present invention is not limited to this configuration.

For example, in the present embodiment, each of the first side wall 62a2 and the second side wall 62a3 is inclined relative to the virtual plane p not only as seen from the radial direction of the disk 62 but also as seen from the first central axis a1 direction of the disk 62.

However, only one of the side surfaces may be inclined. Alternatively, the side surface may not be inclined relative to the plane including the central axis of the disk as seen from the radial direction, or may not be inclined as seen from the circumferential direction. Furthermore, the side surface may be provided to stand relative to the plane part of the disk.

Furthermore, in the above embodiment, the inclination angle of each of the first side wall 62a2 and the second side wall 62a3 relative to the virtual plane p increases toward the outer circumferential side of the disk 62. However, the inclination angle may be constant regardless of the position of the disk in the radial direction.

Next, description will be made as to the hub 61 of the wheel 6a with reference to FIG. 11 and FIG. 12.

First, a schematic configuration of the hub 61 will be described with reference to FIG. 11.

Figure 11:
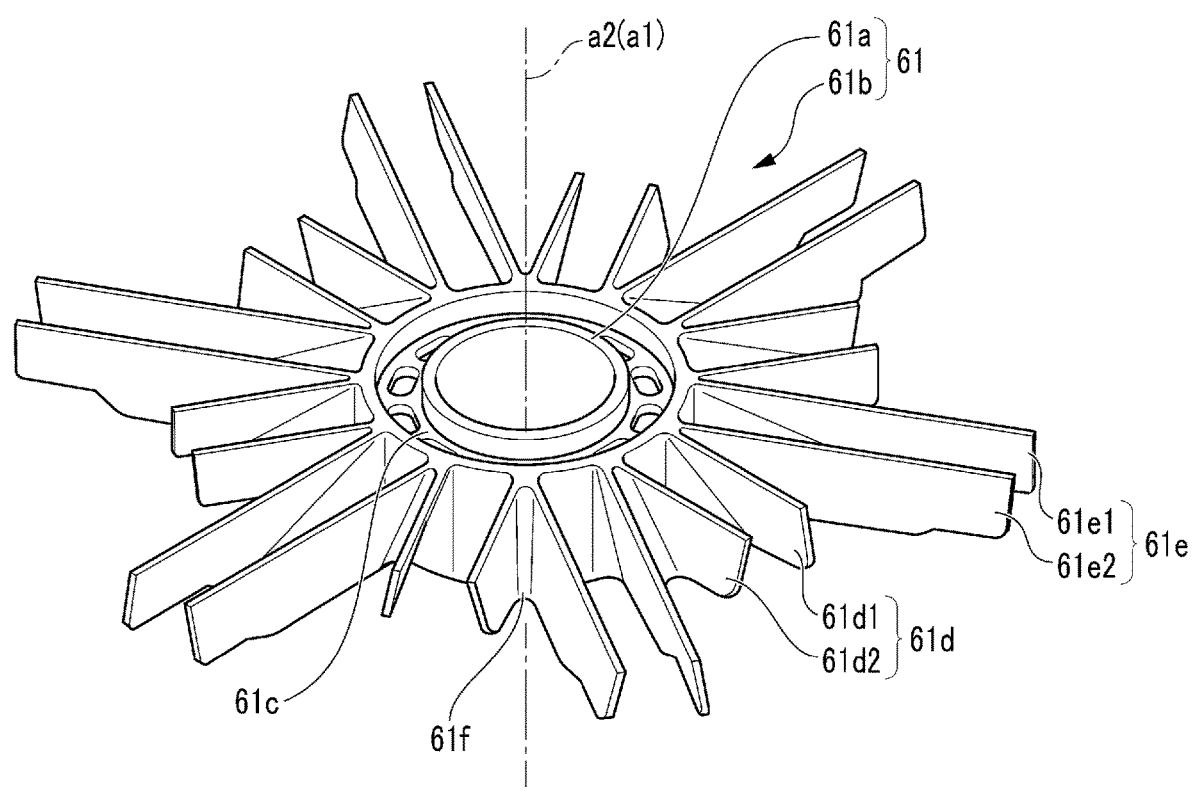
FIG. 11 is a perspective view of a hub of the wheel of FIG. 4.

As shown in FIG. 11, the hub 61 comprises a cylindrical collar part 61a in which the axle is fitted, and a hub part 61b. The hub part 61b includes a cylindrical part 61c in which the collar part 61a is fitted, and a plurality of first fixed parts 61d and a plurality of second fixed parts 61e provided in an outer circumferential portion of the cylindrical part 61c.

Each of the first fixed parts 61d comprises a first blade portion 61d1 (a first blade part) having a long plate shape and extending in the radial direction, and a second blade portion 61d2 (the first blade part) having a long plate shape and extending in the radial direction at a position shifted from the first blade portion 61d1 in the circumferential direction.

The first blade portion 61d1 and the second blade portion 61d2 are inclined to be close to each other toward one side (the side opposite to the cage 1 which is an upper side in FIG. 11) in the first central axis a1 direction of the disk 62 when attached to the disk 62.

Specifically, the first blade portion 61d1 is inclined at an inclination angle corresponding to the surface of the disk 62 on one side (the side opposite to the cage 1) of the first central axis a1 of the first side wall 62a2 which is one of a pair of side surfaces of the first rib 62a, relative to a plane including a second central axis a2 which is a central axis of the hub 61 (i.e., the virtual plane p being a plane including the first central axis a1 of the disk 62 which coincides with the second central axis a2) (see FIG. 7 to FIG. 9).

On the other hand, the second blade portion 61d2 is inclined at an inclination angle corresponding to the surface of the disk 62 on one side (the side opposite to the cage 1) of the first central axis a1 of the second side wall 62a3 which is the other of the pair of side surfaces of the first ribs 62a, relative to the plane including the second central axis a2.

Each of the second fixed parts 61e is provided at a position shifted from the first fixed part 61d in a circumferential direction of the hub 61 (i.e., the circumferential direction of the disk 62). The second fixed part 61e comprises a third blade portion 61e1 (a second blade part) having a long plate shape and extending in the radial direction, and a fourth blade portion 61e2 (the second blade part) having a long plate shape and extending in the radial direction at a position shifted from the third blade portion 61e1 in a circumferential direction.

The third blade portion 61e1 and the fourth blade portion 61e2 are inclined to be close to each other toward one side (the side opposite to the cage 1 which is an upper side in FIG. 11) in the central axis direction of the disk 62 when attached to the disk 62.

Specifically, the third blade portion 61e1 is inclined at an inclination angle corresponding to the surface of the disk 62 on one side (the side opposite to the cage 1) of the first central axis a1 of a first side wall which is one of a pair of side surfaces of the second rib 62b, relative to the plane including the second central axis a2.

On the other hand, the fourth blade portion 61e2 is inclined at an inclination angle corresponding to the surface of the disk 62 on one side (the side opposite to the cage 1) of the first central axis a1 of a second side wall which is the other of a pair of side surfaces of the second rib 62b, relative to the plane including the second central axis a2.

Next, description will be made as to a fixing method of the hub 61 to the disk 62 with reference to FIG. 12.

Figure 12:
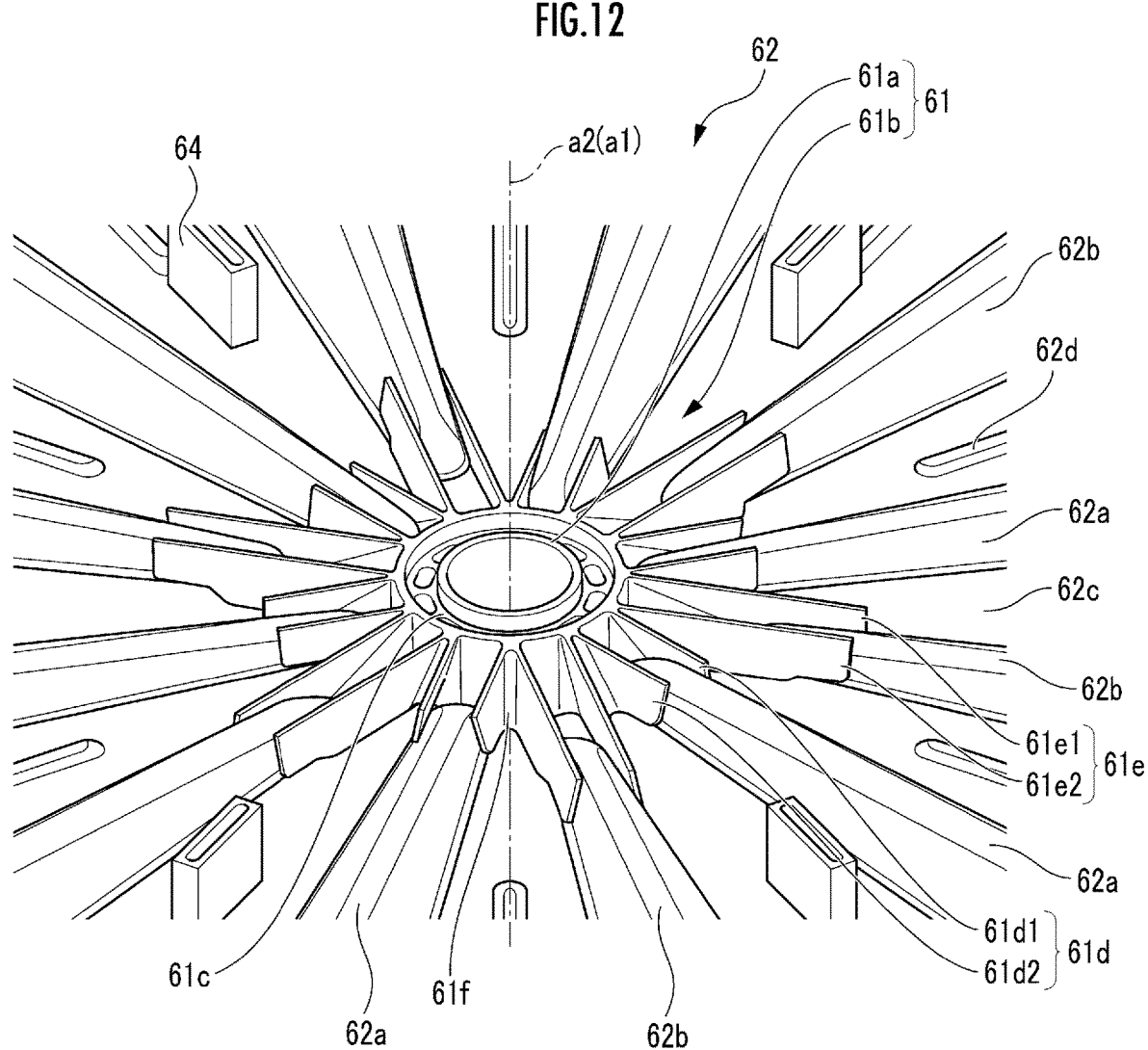
FIG. 12 is an enlarged view showing a structure around the hub of the wheel of FIG. 4.

As shown in FIG. 12, the hub 61 is disposed in the central part of the disk 62. At this time, the first fixed part 61d of the hub 61 is fixed to the first rib 62a of the disk 62 from one side of the first central axis a1 of the disk 62 (the side opposite to the cage 1 which is an upper side in FIG. 12). Furthermore, the second fixed part 61e of the hub 61 is fixed to the second rib 62b of the disk 62 from the one side of the first central axis a1.

More specifically, the first blade portion 61d1 which is the blade portion on one side of the pair of blade portions of the first fixed part 61d is fixed, by bonding or screwing, to a surface of the first side wall 62a2 in a vicinity of a tip portion of the first side wall 62a2 on the inner circumferential side in the radial direction, the first side wall being the side surface on one side of the pair of side surfaces of the first rib 62a.

Similarly, the second blade portion 61d2 which is the blade portion on the other side of the pair of blade portions of the first fixed part 61d is fixed, by the bonding or screwing, to a surface of the second side wall 62a3 in a vicinity of a tip portion of the second side wall 62a3 on the inner circumferential side in the radial direction, the second side wall being the side surface on the other side of the pair of side surfaces of the first rib 62a.

Consequently, opposite side surfaces of the tip portion of the first rib 62a are sandwiched between the first blade portion 61d1 and the second blade portion 61d2 of the first fixed part 61d.

The third blade portion 61e1 which is the blade portion on one side of the pair of blade portions of the second fixed part 61e is fixed, by the bonding or screwing, to a surface of the first side wall in a vicinity of a tip portion of the first side wall on the inner circumferential side in the radial direction, the first side wall being the side surface on one side of the pair of side surfaces of the second rib 62b.

Similarly, the fourth blade portion 61e2 which is the blade portion on the other side of the pair of blade portions of the second fixed part 61e is fixed, by the bonding or screwing, to a surface of the second side wall in a vicinity of a tip portion of the second side wall on the inner circumferential side in the radial direction, the second side wall being the side surface on the other side of the pair of side surfaces of the second rib 62b.

Consequently, opposite side surfaces of the tip portion of the second rib 62b are sandwiched between the third blade portion 61e1 and the fourth blade portion 61e2 of the second fixed part 61e.

Thus, in the wheel 6a, the opposite side surfaces of each of the first rib 62a and the second rib 62b are inclined, and the first blade portion 61d1, the second blade portion 61d2, the third blade portion 61e1 and the fourth blade portion 61e2 which extend from the hub 61 are fixed to the side surfaces. Consequently, in the wheel 6a, the hub 61, and the first ribs 62a and the second ribs 62b are firmly joined without increasing a thickness of the wheel 6a. Eventually, increase in a strength of a joined portion between the hub and each rib is achieved.

Additionally, in the wheel 6a, the first blade portion 61d1 and the second blade portion 61d2 are fixed to sandwich the tip portion of the first rib 62a therebetween, and the third blade portion 61e1 and the fourth blade portion 61e2 are fixed to sandwich the tip portion of the second rib 62b therebetween.

Consequently, even if there is some manufacturing error in sizes of the first rib 62a and the second rib 62b, positions where the first blade portion 61d1, the second blade portion 61d2, the third blade portion 61e1 and the fourth blade portion 61e2 are formed, or the like, a sufficient joining area can be easily acquired. As a result, precision required during manufacturing can be decreased, and hence quality stabilization and manufacturing cost reduction can be achieved.

Note that the wheel of the present invention is not limited to this configuration. For example, the rib (the protrusion) may be inclined only on one side in the circumferential direction of the disk.

For example, in the wheel 6a of the present embodiment, the first blade portion 61d1 and the second blade portion 61d2 or the third blade portion 61e1 and the fourth blade portion 61e2 which extend from the hub 61 are joined to all the tip portions of the six first ribs 62a and the six second ribs 62b.

However, the number of the ribs (the protrusions) and the number of the blade portions may be appropriately changed in accordance with the required strength or the like. Furthermore, the blade portions may be fixed not to all the ribs but to some ribs (e.g., only to the first ribs 62a in the present embodiment).

Furthermore, for example, the blade portions extending from the hub do not necessarily have to sandwich the tip portion of the rib (the protrusion) between the opposite side surfaces, and the blade portion may be fixed only to the side surface of the rib on one side. In this configuration, although the strength of the joined portion decreases, the weight reduction and manufacturing cost reduction can be achieved.

As shown in FIG. 11, the first blade portion 61d1 is the blade portion of the first fixed part 61d on one side in the circumferential direction, and the fourth blade portion 61e2 is the blade portion of the second fixed part 61e on the other side in the circumferential direction, the second fixed part being adjacent to the first fixed part 61d on the one side in the circumferential direction. The first blade portion 61d1 and the fourth blade portion 61e2 are integrated in a part on the inner circumferential side in the radial direction, to form a base end portion 61f.

Similarly, the second blade portion 61d2 is the blade portion of the first fixed part 61d on the other side in the circumferential direction, and the third blade portion 61e1 is the blade portion of the second fixed part 61e on one side in the circumferential direction, the second fixed part being adjacent to the first fixed part 61d on the other side in the circumferential direction. The second blade portion 61d2 and the third blade portion 61e1 are integrated in a part on the inner circumferential side in the radial direction, to form the base end portion 61f.

The base end portion 61f extends in the radial direction from the second central axis a1 as the center, and the first blade portion 61d1 and the fourth blade portion 61e2, or the second blade portion 61d2 and the third blade portion 61e1 extend to branch from one base end portion 61f.

Furthermore, a thickness of the base end portion 61f is larger than a thickness of each of the first blade portion 61d1, the second blade portion 61d2, the third blade portion 61e1 and the fourth blade portion 61e2.

Since the hub 61 is provided with the base end portion 61f, increase in a strength of the first fixed part 61d and the second fixed part 61e on a base end side (eventually, a strength of the wheel 6a around the axle) can be achieved.

Note that the base end portion 61f is located on the inner circumferential side in the radial direction of the disk 62 than the first ribs 62a or the second ribs 62b.

Note that the fixed part of the present invention is not limited to this configuration. All the blade portions may be provided independently, or only some of the plurality of blade portions may be integrated with the adjacent blade portions. Alternatively, an extending direction of the base end portion may be the same as that of one of the integrated blade portions. Specifically, the blade portion may be formed to branch from a middle of the other straight extending blade portion.

Furthermore, a length of each of the third blade portion 61e1 and the fourth blade portion 61e2 in the radial direction is larger than a length of each of the first blade portion 61d1 and the second blade portion 61d2 in the radial direction.

Specifically, as shown in FIG. 12, in a case where the hub 61 is attached to the disk 62, the lengths of the first blade portion 61d1 and the second blade portion 61d2 are set so that the tip portions of the blade portions can reach the tip portion of the first rib 62a, and the lengths of the third blade portion 61e1 and the fourth blade portion 61e2 are set so that the tip portions of the blade portions can reach the tip portion of the second rib 62b which is located outside the tip portion of the first rib 62a in the radial direction.

Consequently, the joined positions among the first rib 62a and the second rib 62b, and the first blade portion 61d1, the second blade portion 61d2, the third blade portion 61e1 and the fourth blade portion 61e2 (i.e., positions where stress against a load from the axle, an input driving force or the like tends to concentrate) are not arranged in a row in the circumferential direction, and are arranged at positions shifted in the radial direction. As a result, the stress can be distributed, and hence the strength of the whole wheel can be further increased.

Note that the hub of the present invention is not limited to this configuration. The lengths of the blade portions may be all set to the same length, or may be set to appropriately different lengths in accordance with the strength required for the wheel, or the like. For example, in a configuration where the pair of blade portions forms the fixed part as in the present embodiment, instead of changing the length of the blade portion for each fixed part, the length of the blade portion on one side in a rotating direction of the wheel in the pair of blade portions of the fixed part may only be decreased or increased.

Furthermore, a width around the base end portion 61f of the first blade portion 61d1 and the second blade portion 61d2 is set to be larger than the width of the tip portion. In other words, the widths of the first blade portion 61d1 and the second blade portion 61d2 are set to increase toward the inner circumferential side in the radial direction of the disk 62.

This is because the stress against the load from the axle, the input driving force or the like tends to increase around the axle (i.e., toward the inner circumferential side in the radial direction of the disk 62). To solve the problem, in the hub 61, if the widths of the first blade portion 61d1 and the second blade portion 61d2 are increased toward the inner circumferential side in the radial direction, the stress can be efficiently received in each joined portion between each of the first rib 62a and the second rib 62b, and each of the first blade portion 61d1, the second blade portion 61d2, the third blade portion 61e1 and the fourth blade portion 61e2.

Note that the hub of the present invention is not limited to this configuration. The widths of the blade portions may be uniformly set, or increased toward the outer circumferential side in the radial direction, in accordance with the strength required for the disk, the shape of the rib (the protrusion) or the like. Furthermore, the widths of the blade portions may be changed in three or more stages, or may be continuously changed.

The shown embodiment has been described above, but the present invention is not limited to this aspect.

For example, in the above embodiment, the wheel 6a is not provided with any spokes. However, the wheel of the present invention may be provided with the spokes.

Furthermore, in the above embodiment, the wheel 6a on the side opposite to the cage 1 is covered with the cover 63. However, according to the wheel of the present invention, the wheel on the side opposite to the cage may be covered with a disk in which ribs (protrusions) are formed, in place of the cover. Additionally, in this case, the wheel on the cage side may be covered with a cover in which any protrusions are not formed, in place of the disk.

REFERENCE SIGNS LIST 1 cage
1a seating seat
2 vehicle body frame
3 steering handle
4 front wheel
5 front fork
5a column part
5b fork part
5c bearing hole
6 rear wheel (driving wheel)
6a wheel
6b tire
7 hand rim
60 rim
61 hub
61a collar part
61b hub part
61c cylindrical part
61d first fixed part
61d1 first blade portion (first blade part)
61d2 second blade portion (first blade part)
61e second fixed part
61e1 third blade portion (second blade part)
61e2 fourth blade portion (second blade part)
61f base end portion
62 disk
62a first rib (first protrusion)
62a1 bottom surface
62a2 first side wall
62a3 second side wall
62b second rib (second protrusion)
62c flat plate
62d first auxiliary rib
62e second auxiliary rib
62f first groove
62g second groove
62h third groove
62i fourth groove
62j first insertion hole
62k second through hole
63 cover
64 holder
a1 first central axis
p virtual plane
W wheelchair

The invention claimed is:

1. A wheel comprising:
a ring-shaped rim on which a tire is fitted, and a disk having a flat circular shape and disposed on an inner circumference of the rim, wherein
the disk comprises a protrusion extending in a radial direction of the disk,
a width of the protrusion in a circumferential direction of the disk increases toward an outer circumferential side of the disk, and
an edge shape of a tip portion of the protrusion on the outer circumferential side in the radial direction is a curved shape which is curved along a circumferential edge of the disk, or a straight line shape which is orthogonal to a straight line passing a center of the disk and extending in the radial direction.

2. The wheel according to claim 1, wherein
the protrusion protrudes out to one side in a central axis direction of the disk, and
in a portion of the disk which corresponds to the protrusion on the other side in the central axis direction, a groove dented toward the one side in the central axis direction of the disk is formed.

3. The wheel according to claim 1, wherein
at least one of a pair of side surfaces of the protrusion is inclined relative to a plane including a central axis of the disk.

4. A driving wheel comprising the wheel according to claim 1, and a tire fitted on the wheel.

5. A wheel comprising:
a ring-shaped rim on which a tire is fitted, and a disk having a flat circular shape and disposed on an inner circumference of the rim, wherein
the disk comprises a protrusion extending in a radial direction of the disk,
a width of the protrusion in a circumferential direction of the disk increases toward an outer circumferential side of the disk,
at least one of a pair of side surfaces of the protrusion is inclined relative to a plane including a central axis of the disk and
an inclination angle of the at least one of the pair of side surfaces of the protrusion relative to the plane increases toward the outer circumferential side of the disk.

6. A wheel comprising:
a ring-shaped rim on which a tire is fitted, and a disk having a flat circular shape and disposed on an inner circumference of the rim, wherein
the disk comprises a plurality of protrusions extending in a radial direction of the disk, and a flat plate provided between two protrusions which are adjacent,
a width of each of the protrusions in a circumferential direction of the disk increases toward an outer circumferential side of the disk,
the flat plate is formed by stacking a plurality of fiber reinforced material sheets including at least a first fiber reinforced material sheet and a second fiber reinforced material sheet,
the first fiber reinforced material sheet includes a first fiber having a fiber direction being a first direction along a straight line passing a center of the first fiber reinforced material sheet and extending from a center of the disk in the radial direction, and
the second fiber reinforced material sheet includes a second fiber having a fiber direction being the first direction, and a third fiber having a fiber direction being a second direction intersecting the first direction.

* * * * *